United States Patent
Van Bennekom

[11] Patent Number: 6,103,038
[45] Date of Patent: Aug. 15, 2000

[54] METHOD OF COATING FUSING MEMBERS USED IN XEROGRAPHIC PRINTING

[75] Inventor: Hans Lochmann Van Bennekom, Dansville, N.Y.

[73] Assignee: Xerox Corporation, Stamford, Conn.

[21] Appl. No.: 09/220,001

[22] Filed: Dec. 21, 1998

Related U.S. Application Data

[63] Continuation-in-part of application No. 09/069,476, Apr. 29, 1998.

[51] Int. Cl.$^7$ ...................................................... B65H 81/06
[52] U.S. Cl. ......................... 156/187; 156/230; 156/241; 29/895.211; 29/895.32
[58] Field of Search ..................................... 156/241, 230, 156/187; 29/895.211, 895.212, 895.32

[56] References Cited

U.S. PATENT DOCUMENTS

| | | | |
|---|---|---|---|
| 2,257,823 | 10/1941 | Stokes | 93/3 |
| 3,607,494 | 9/1971 | Rowand | 156/86 |
| 3,677,856 | 7/1972 | MacCallum et al. | 156/187 |
| 5,123,151 | 6/1992 | Uehara et al. | 29/130 |
| 5,468,531 | 11/1995 | Kikukawa et al. | 428/36.5 |
| 5,716,700 | 2/1998 | Kikukawa et al. | 428/339 |

FOREIGN PATENT DOCUMENTS

WO 96/10778  4/1995  WIPO .

Primary Examiner—Michael W. Ball
Assistant Examiner—Gladys Piazza
Attorney, Agent, or Firm—R. Hutter

[57] ABSTRACT

A low-friction membrane is attached smoothly and tightly to a fusing member such as used in xerography. A combination sheet is provided, the combination sheet having a membrane attached to a heat-deformable backing layer. The combination sheet is drawn over the combination layer, and then, in a sintering process, the membrane detches from the backing layer and shrinks tightly onto the fusing member. The backing layer is then stripped from the fusing member.

10 Claims, 3 Drawing Sheets

METHOD OF COATING FUSING MEMBERS USED IN XEROGRAPHIC PRINTING

CONTINUATION-IN-PART APPLICATION

This application is a Continuation-in-Part of U.S. patent application Ser. No. 09/069,476, filed Apr. 29, 1998, which is incorporated by reference.

FIELD OF THE INVENTION

The present invention relates to a method of coating fusing members, such as used in xerography, and more particularly is directed to applying a membrane over the fusing member and sintering the membrane to the fusing member to provide a uniform coating on the fusing member.

BACKGROUND OF THE INVENTION

In a typical electrostatographic reproducing apparatus, a light image of an original to be copied is recorded in the form of an electrostatic latent image upon a photosensitive member and the latent image is subsequently rendered visible by the application of toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse toner onto a support surface permanently by heat, it is usually necessary to elevate the temperature of the toner to a point at which the constituents of the toner coalesce and become tacky. This heating causes the toner to flow to some extent into the fibers or pores of the support member. Thereafter, as the toner cools, solidification of the toner causes it to be firmly bonded to the support.

In color fusing, customer preference for color prints is often a high gloss or matte opaque finish. This usually requires the use of a smooth, conformable heat member operating at a high temperature and having a long-dwell nip. In addition, extra release agent is necessary for improving toner release due to the increase in toner used for color developing. For developing color images, several layers of different color toner are deposited on the latent image resulting in extra thickness (higher toner pile height) of unfused toner on a color image. Therefore, a higher operating temperature for color fusers is necessary. Further, extended dwell time at the nip is necessary to ensure complete toner flow. In addition, a conformable fusing member is necessary in order to ensure sufficient release and stripping. Moreover, a smooth surface is necessary in order to provide color images with preferred increased gloss.

However, known fusing members do not provide the quality for colored images as they do for black and white images. Therefore, it is desired to provide a heat member, preferably in combination with a pressure member, wherein high quality color prints or copies are produced. Particularly, it is desired to provide fusing members demonstrating excellent results at the higher temperatures necessary in color fusing. In addition, it is desired to provide fusing members which require little or no fusing oil on the outer surface, while still providing excellent release. Further, it is desired to provide fusing members which provide complete toner flow, and increased gloss. Moreover, it is desired to reduce or eliminate pinhole defects in the polymeric layer of the fusing member.

DESCRIPTION OF THE PRIOR ART

Several approaches to thermal fusing of toner images have been described. These methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members.

Known fusing members include those with outer layers of polytetrafluoroethylene to which a release agent such as silicone oil has been applied. The Teflon-type outer layer has a thickness of about several mils. Silicone rubber and fluoroelastomers such as VITON® (Trademark from E.I. DuPont) coated heat members have been used to enhance copy quality.

WO 96/10778 discloses a release coating for use on printer rollers and belts. The coating is a thin expanded polytetrafluorethelene skin that has a porous surface attached to a substratum with an adhesive layer and an impermeable surface exposed as the contact surface. The use of dual surfaces on a single thin coating provides for a bond to the substratum materials, such as the silicone elastomer layer, as well as being wear and chemical resistant.

U.S. Pat. No. 5,123,151 teaches an elastic fixing roll with an elastic body layer not less than 200 $\mu$m thick formed on a metal core with a covering layer with a release property formed in a thickness ranging from 3 $\mu$m to 200 $\mu$m on the surface of the elastic body, the covering layer being formed of a composite material composed of fibrillated PTFE and elastomer having releasing properties. When the covering layer is applied in sheet form it is wound or wrapped around the fixing roll, however the wrapping technique of the present invention is not disclosed.

U.S. Pat. No. 5,468,531 discloses an elastic fixing roll having an elastic compliant body material and release surface material. The body material is made of porous rubber or foam. The release surface material is formed of porous PTFE film containing silicone rubber or fluorosilicone rubber. The release surface material is bonded to the body material by a non-continuous layer of adhesive. U.S. Pat. No. 5,716,700 is drawn to an elastic fixing roll similar to that of U.S. Pat. No. 5,468,531, however the release surface material is adhered to the outer surface of the elastic porous body material by bonding of portions of the rubber of the release material to contacting portions of the rubber of the porous body material.

SUMMARY OF THE INVENTION

The present invention is directed to a method of coating a fusing member for use in an electrostatographic apparatus. A combination sheet is provided, the combination sheet including a backing layer and a membrane. The combination sheet is wrapped around the fusing member. The combination sheet is sintered so that the membrane attaches to the fusing member.

DETAILED DESCRIPTION OF THE INVENTION

"Fusing member" as used herein refers to fusing members including fusing rolls, belts, films, sheets and the like; donor members, including donor rolls, belts, films, sheets and the like; and pressure members, including pressure rolls, belts, films, sheets and the like; and other members useful in the fusing system of an electrostatographic or xerographic, including digital, machine. The fusing member of the present invention may be employed in a wide variety of machines and is not specifically limited in its application to the particular embodiment depicted herein.

Any suitable substrate may be selected for the fusing member. The fusing member substrate may be a roll, belt, flat surface, sheet, film, or other suitable shape used in the fixing of thermoplastic toner images to a suitable copy substrate. It may take the form of a fusing member, a pressure member or a release agent donor member, preferably in the form of a cylindrical roll. Typically, the fusing member is made of a hollow cylindrical metal core, such as copper, aluminum, stainless steel, or certain plastic materials chosen to maintain rigidity, structural integrity, as well as being capable of having a polymeric material coated thereon and adhered firmly thereto. It is preferred that the supporting substrate is a cylindrical metal roller. In one embodiment, the core, which may be an aluminum or steel cylinder, is degreased with a solvent and cleaned with an abrasive cleaner prior to being primed with a primer, such as Dow Corning 1200, which may be sprayed, brushed or dipped, followed by air drying under ambient conditions for thirty minutes and then baked at 150° C. for 30 minutes.

Figure 1:
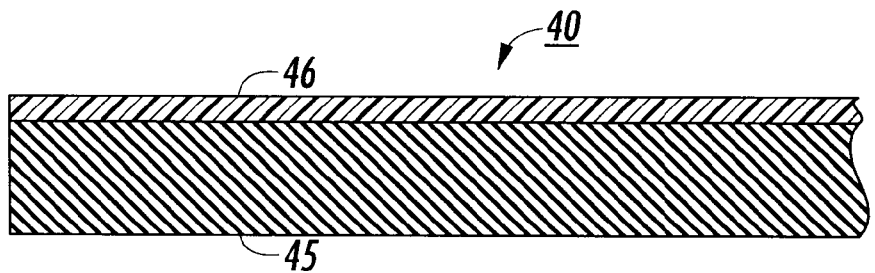
FIG. 1 is a sectional view of a "combination sheet" used in the method of the present invention.

The present invention is directed to an improved method for placing a low-friction membrane on the outer surface of a fusing member. Generally, according to this improved method, there is first provided what is called a "combination sheet," here generally indicated as 40 and shown in cross-section in FIG. 1. According to the present invention, this combination sheet 40 comprises two distinct layers: a backing layer indicated as 45, and the membrane itself, indicated as 46. The membrane 46 is attached to backing layer 45 by a water-soluble adhesive, or by partial melting of one layer onto the other. In the preferred embodiment of the present invention, the backing layer 45 is approximately 20 mil thick, and largely comprises polyethylene or polypropylene. The important property of the backing layer 45 is that the layer is heat deformable at lower than the sintering temperature, which will be described in detail below. Also in the preferred embodiment of the invention, the membrane 46 is a two-mil thick layer of PTFE.

The overall purpose of the improved method of the present invention is to effectively transfer the membrane 46 from combination sheet 40 onto the outer surface of a fusing member 20. The combination sheet 40 is placed on the outer surface of the fusing member 20, with the membrane 46 in direct contact with the fusing member 20. The fusing member 20, with the combination sheet 40 placed thereon, is then sintered, or in other words heated, so that the membrane 46 on combination sheet 40 detaches from the backing layer 45 and shrinks tightly around the main surface of the fusing member 20. Then the backing layer 45 is pulled or peeled off of the fusing member 20, thus leaving a relatively even membrane 46 attached to the outside of fusing member 20.

Figure 2:
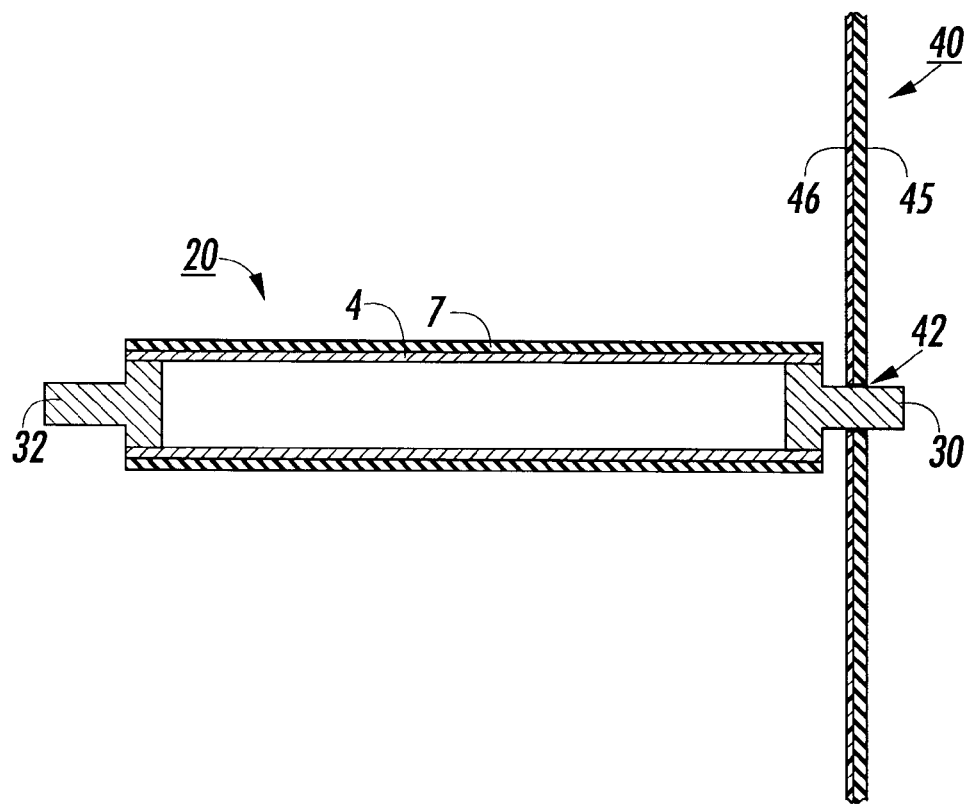
FIG. 2 is an elevational view showing the orientation of a sheet of polymeric material with respect to a fusing member prior to wrapping.

One step of applying a membrane to the fusing member is shown in FIG. 2. At this stage fusing member 20, which in this embodiment is a roll, incudes substrate 4 and intermediate layer 7, and having journals 30 and 32 at each end. Initially, fusing member 20 is oriented substantially perpendicular to polymeric sheet 40, journal 30 optionally passing through hole 42 or pressing against intact sheet 40 with sufficient force to hold sheet 40 firmly in place with respect to fusing member 20. The elongated pore direction of the sheet and fusing member 20 is oriented such that the elongated pore direction is substantially parallel with the longitudinal axis of fusing member 20 when the sheet is applied to the fusing member. Combination sheet 40 is then smoothly wrapped around fusing member from journal 30 to journal 32 such that there are no overlapping seams. After this initial wrapping step, the wrapped combination layer is sintered onto the fusing member 20.

Figure 3:
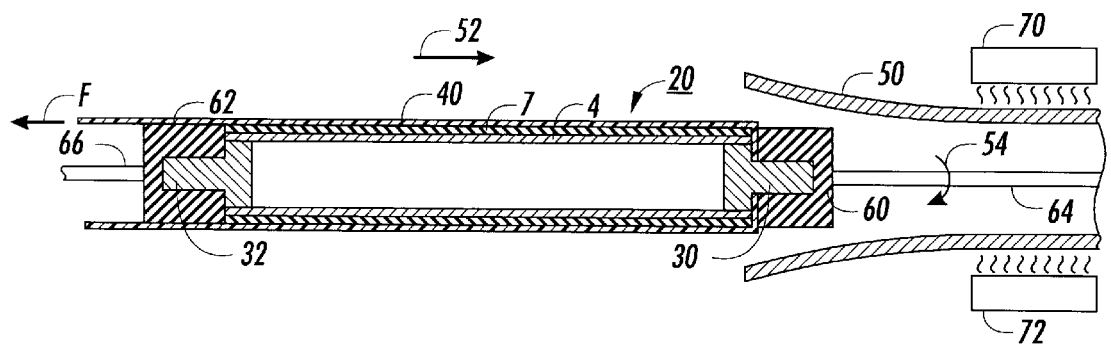
FIG. 3 is a sectional view showing the wrapped fusing member at one step of the sintering process.

FIG. 3 shows the wrapped fusing member 20 as the fusing member enters heating tube 50 as part of the sintering process. Heating tube 50 may be made of any material which conducts heat and preferably is metal. After fusing member 20 is wrapped with combination sheet 40, the fusing member is inserted between end caps 60 and 62 which fit snugly over journals 30 and 32 at each end of fusing member 20. End cap 60 fits over journal 30 and holds sheet 40 in place as fusing member enters heating tube 50. The end caps are preferably made of rubber or plastic, however may be any other material which can withstand the sintering process without melting. End caps 60 and 62 are rotatably supported by end cap supports 64 and 66 which may be separate from or formed integrally with the end caps, the end cap supports supporting the fusing member as it travels through heating tube 50. End cap supports 64 and 66 provide sufficient force to end caps 60 and 62 to support fusing member 20 and the end cap supports work together to move fusing member 20 through heating tube 50 in the direction shown by arrow 52.

In the embodiment shown, heating tube 50 has heat sources 70 and 72, which supply sufficient heat to sinter combination sheet 40 onto fusing member 20. The heat sources may be any type of heat source which can supply the required amount of heat to the heating tube 50 and may also be a single heat source. The exact amount of heat and time period over which the heat is applied depends upon the type of sheet material used and the degree of sintering required. The desired outcome of the sintering process is to have a fusing member with polymeric coating having a consistent degree of sintering over the entire fusing member, the coating being able to withstand the operating conditions in a fusing system and provide good toner release. An optional adhesive layer may be applied to intermediate layer 7 prior to applying sheet 40. Also, intermediate layer 7 may be ground and cleaned prior to applying sheet 40.

In addition to the heat, pressure is also applied to the fusing member to ensure that sheet material 40 is smoothly applied and properly bonded to intermediate layer 7. In the embodiment shown, the pressure necessary for sintering is supplied by sizing the fusing member diameter and heating tube diameter such that when fusing member 20 travels through heating tube 50, the desired pressure is applied by the inner surface of heating tube 50 against fusing member 20. Of course, any other equivalent pressure source, such as a separate pressure applicator, associated with the heating process when a heating tube as described is not used. The temperature range is 320–450 C for the time required to achieve the desired degree of sinter, which varies with the thickness of the polymer sheet and the pressure range is from 5–50 psi with a rotation rate of 0.5 to 1 revolution over 350 mm.

During the sintering process it has been found that rotating the fusing member as it travels through the heating tube results in a more even polymer coating. This rotation is accomplished by rotating end cap supports 64 and 66 which in turn cause the fusing member to rotate, as shown by arrow 54.

Figure 4:
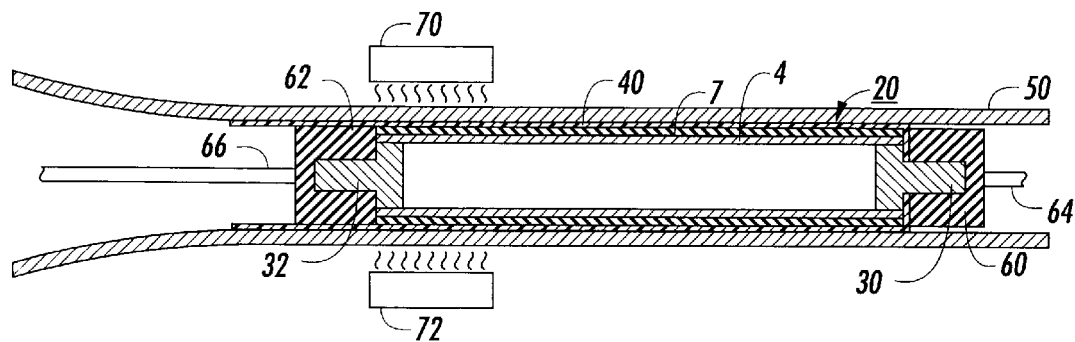
FIG. 4 is a sectional view showing the wrapped fusing member at another step of the sintering process.

FIG. 4 shows the coated fuser roll later in the sintering process. It is preferred that the membrane 46 be coated to a thickness of from about 2 to about 25 microns, preferably from about 5 to about 15 microns, and particularly preferred from about 7 to about 14 microns. The end caps 60 and 62 are removed from journals 30 and 32 and the ends of the fusing member are then properly sealed and trimmed by any known method such as adhesive, heat, knife, or laser treatment.

The membrane 46 may shrink as much as 40% during the sintering process, which closes up the previously expanded pores in the membrane and results in no wrinkling. The desired pore size is between 0.5–1 microns.

Figure 5:
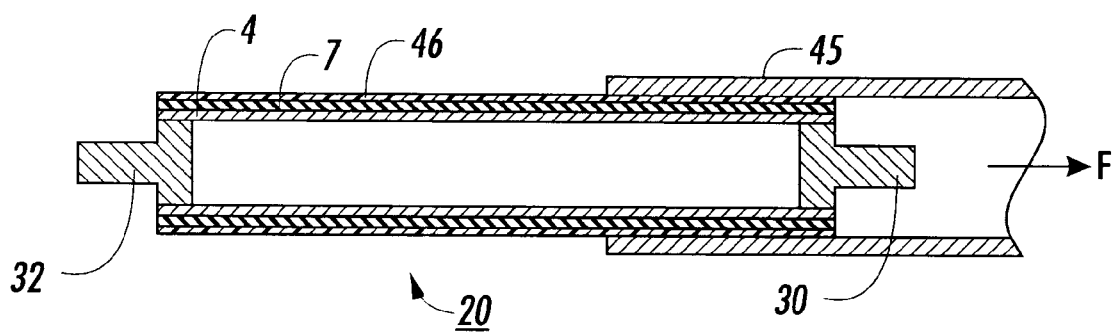
FIG. 5 is a sectional view showing the the wrapped fusing member as the backing layer of the combination sheet is being removed.

FIG. 5 shows a subsequent step in the process according to the present invention, after the membrane 46 has been sintered onto the outermost surface (in this particular embodiment, the intermediate layer 7) of the fusing member 20. Following the sintering step, the membrane 46 is detached from backing layer 45 and shrunk tightly around the fusing member 20, effectively attaching itself to the fusing member 20. At this stage, the backing layer 45, now without membrane 46 thereon, can simply be pulled or peeled off of fusing member 20, such as by pulling the now-tubular backing layer 45 in direction F, as shown.

It has been found that a sintering temperature of approximately 427° C. results in the desired shrinkage of membrane 46 around the body of fusing member 20, and also results in the desired porosity of the membrane 46 on fusing member 20.

The overall practical advantage of the method of the present invention is that the use of a backing layer such as 45 provides a better control of the overall surface porosity in the final fusing member 20, thus resulting in a more desirable gloss to electrostatographic images created with the fusing member 20. Further, use of the backing layer 45 simplifies the handling of the partially-finished fusing member, and avoids tool marks which may be placed on the fusing member 20.

If it is desired to place the membrane on another type of fusing member besides a roll, such as a flexible belt, it is conceivable that above-described steps could be applied toward attaching the membrane 46 not onto the roll-shaped fusing member 20 itself, but onto a flexible substate which is merely temporarily placed over a rigid roll, the roll acting as a form for the flexible substrate. Following the above steps, the flexible substrate can be removed from the roll, leaving the substrate with the membrane sintered thereto.

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

What is claimed is:

1. A method of coating a fusing member for use in a electrostatographic apparatus, comprising the steps of;

providing a combination sheet, the combination sheet including a backing layer and a membrane;

wrapping the combination sheet around the fusing member;

sintering the combination sheet to the fusing member so that the membrane attaches to the fusing member, the sintering step including applying heat and pressure to the combination sheet and fusing member by rotating the wrapped fusing member through a heating tube where an inner wall of the heating tube presses against the wrapped fusing member to attach the membrane to the fusing member; and removing the backing layer from the fusing member.

2. The method of claim 1, further comprising the step of placing the fusing member, the fusing member having a first end and a second end, in a substantially perpendicular position with respect to the combination sheet; and wherein the wrapping step includes wrapping the combination sheet around the fusing member such that the combination sheet comes into contact with the first end of the fusing member and is then wrapped along the length of the fusing member from the first end to the second end to form a continuous layer over the fusing member.

3. The method of claim 1, wherein the backing layer is heat deformable at lower than a temperature used in the sintering step.

4. The method of claim 3, the backing layer comprising polyethylene.

5. The method of claim 3, the backing layer comprising polypropylene.

6. The method of claim 1, the membrane comprising PTFE.

7. The method of claim 1 wherein the fusing member is a roll.

8. The method of claim 1, wherein applying heat and pressure further comprises:

applying pressure based on the sizing of the heating tube and the fusing member such that the heating tube inner wall presses against the fusing member to supply pressure.

9. The method of claim 1, wherein rotating the wrapped fusing member includes rotating the wrapped fusing member at least one half a revolution for every 350 mm of travel through the heating tube.

10. The method of claim 1, wherein the membrane comprises PTFE and wherein the sintering step comprises the steps of heating the fusing member to between about 320–370 C and applying pressure between about 10–15 psi to the fusing member.

* * * * *